US009634882B2

(12) United States Patent
Carter et al.

(10) Patent No.: US 9,634,882 B2
(45) Date of Patent: Apr. 25, 2017

(54) METHOD AND SYSTEM FOR CONTINUOUS APPLICATION STATE

(71) Applicant: Oracle International Corporation, Redwood Shores, CA (US)

(72) Inventors: Wayne A. Carter, Salt Lake City, UT (US); Rahim Mohamed Yaseen, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 372 days.

(21) Appl. No.: 13/626,211

(22) Filed: Sep. 25, 2012

(65) Prior Publication Data

US 2013/0173774 A1 Jul. 4, 2013

Related U.S. Application Data

(60) Provisional application No. 61/542,016, filed on Sep. 30, 2011.

(51) Int. Cl.
*G06F 15/173* (2006.01)
*H04L 12/24* (2006.01)
*H04L 29/08* (2006.01)

(52) U.S. Cl.
CPC ......... *H04L 41/00* (2013.01); *H04L 67/142* (2013.01); *H04L 41/5064* (2013.01)

(58) Field of Classification Search
CPC ..... H04L 67/2842; H04L 67/10; H04L 63/12; H04L 29/06; H04L 67/14; H04L 67/2804; H04L 67/2823; H04L 69/329; H04L 12/12

USPC ............................................. 709/223
See application file for complete search history.

(56) References Cited

U.S. PATENT DOCUMENTS

| 2003/0220984 | A1* | 11/2003 | Jones | H04L 29/06 709/219 |
| 2004/0143669 | A1* | 7/2004 | Zhao et al. | 709/228 |
| 2011/0238736 | A1* | 9/2011 | Tanaka | G06F 9/5011 709/203 |
| 2012/0069131 | A1* | 3/2012 | Abelow | G06Q 10/067 348/14.01 |
| 2012/0150751 | A1* | 6/2012 | Pandey et al. | 705/301 |
| 2012/0179361 | A1* | 7/2012 | Mineta | G01C 21/3676 701/410 |
| 2012/0210343 | A1* | 8/2012 | McCoy | H04N 21/25875 725/25 |

* cited by examiner

*Primary Examiner* — Kevin Bates
*Assistant Examiner* — Sm Rahman
(74) *Attorney, Agent, or Firm* — Vista IP Law Group, LLP (57) ABSTRACT

Disclosed are methods and apparatuses to share application state across devices. This approach allows the user to switch devices and have the application on the new device share the same state as the previous device. In addition, this approach allows the user to shut down a device at a first point in time, and later be presented with the same state for the application at a second point in time on the same device when it is turned back on.

33 Claims, 9 Drawing Sheets

FIG. 7

METHOD AND SYSTEM FOR CONTINUOUS APPLICATION STATE

RELATED APPLICATIONS

The present application claims the benefit of priority to U.S. Provisional Patent Application Ser. No. 61/542,016, entitled "METHOD AND SYSTEM FOR CONTINUOUS APPLICATION STATE", filed on Sep. 30, 2011, which is hereby incorporated by reference in its entirety.

BACKGROUND AND SUMMARY

In many situations, application users may choose to run the same application on multiple devices. Such devices include, for example, mobile phones, tablet computers, laptops, etc. These devices may be used either concurrently or in isolation.

For example, consider the situation when a user is a salesperson that utilizes a CRM (customer relationship management) application. The salesperson may be using a mobile CRM client on his/her mobile telephone to contact a potential customer for a sales call. During the call, the salesperson may use the mobile telephone to access the CRM application to discuss the possible sales opportunities.

However, in the course of the call, the salesperson may realize that it is necessary to obtain much greater details regarding the opportunities than is efficient or convenient using a mobile telephone. Instead, the salesperson would like to utilize a larger mobile device (such as a tablet or laptop computer) to access the CRM application to continue the discussion of the sales opportunities.

Currently, when a user accesses an application from one device (e.g. mobile phone) and then accesses the same application from another device (e.g. tablet) the user is presented with two separate application states that are not continuous and have no knowledge of each other.

In the example above, this means that once the salesperson switches over to the tablet computer from his/her mobile telephone, the salesperson would need to manually re-navigate in the application on the tablet to get to the exact same state that existed on the mobile telephone before the switchover.

This type of behavior is significantly disruptive when the user is changing devices but needs to access the same place in the application on the new device.

Therefore, there is a need for an improved approach that addresses at least these problems with the prior approaches.

SUMMARY

Some embodiments of the invention address the above problems using a method and apparatus to share the application state across devices. This approach allows the user to switch devices and have the application on the new device share the same state as the previous device.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of CRM applications. It is noted, however, that the invention is not limited in its scope to CRM applications, and indeed, may be applied to other types of applications as well.

Some embodiments of the invention address the above-described problems using a method and apparatus to share the application state across devices. This approach allows the user to switch devices and have the application on the new device share the same state as the previous device.

For example, a user of a CRM application navigates to a specific Account 'Acme, Corp.' on their mobile phone and then uses the click-to-call feature to call the Account. While on the call the user needs access to more information about that same Account. The user opens the CRM application on their tablet computer and it is in the exact state as the mobile phone showing the Account 'Acme, Corp.'

Figure 1:
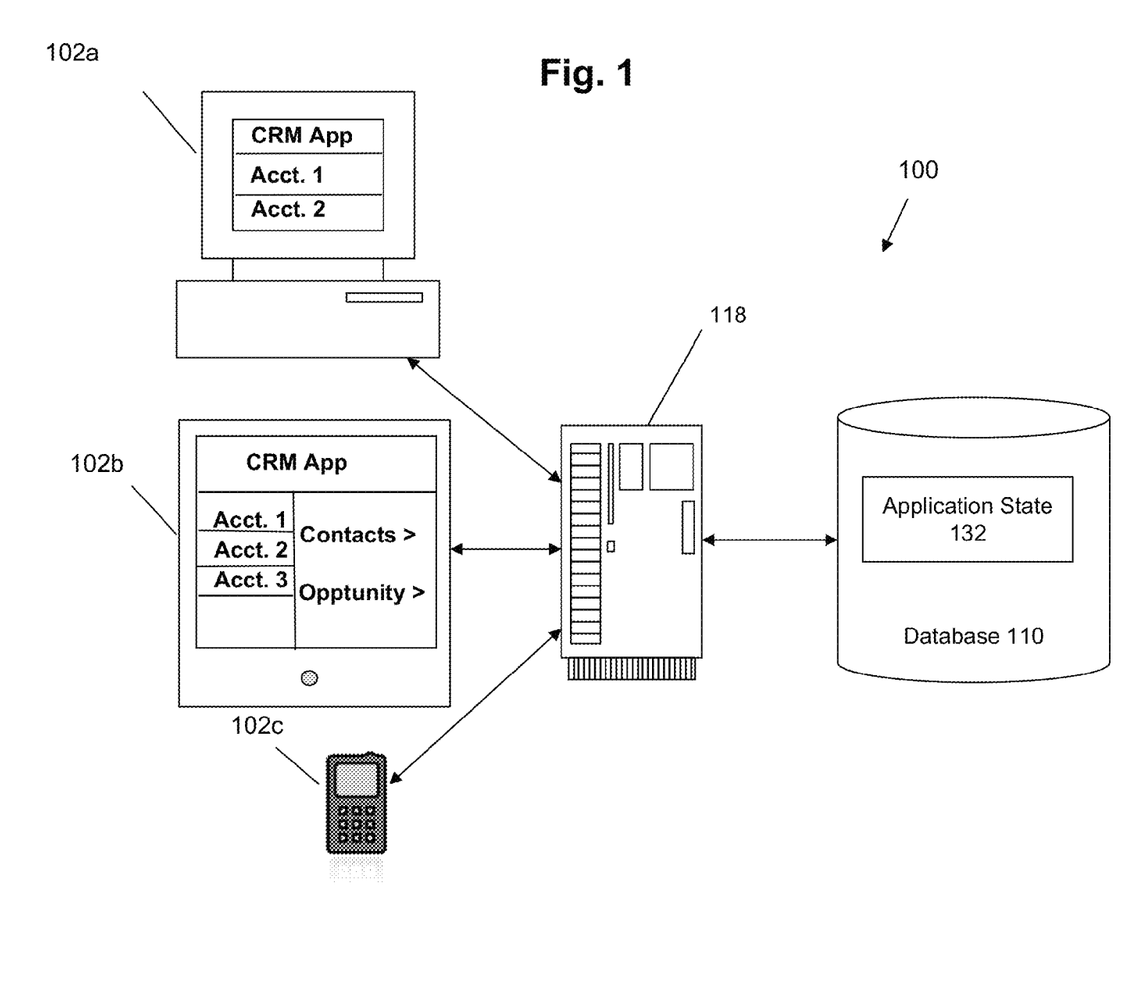
FIG. 1 illustrates an example system for implementing continuous application state according to embodiments of the invention.

FIG. 1 shows an architecture of a system 100 for implementing an continuous application state according to some embodiments of the invention. System 100 may include one or more users at one or more user stations 102a, one or more tablet devices 102b, or one or more mobile telephone device 102c. The users operate the system 100 to access and utilize applications on an application server 118 to perform any activities operable using the application server 118.

According to some embodiments of the invention, when the user at any of the user station 102a, tablet device 102b, or mobile telephone device 102c accesses an application (e.g., CRM application) on application server 118, the application server 118 will store the current state 132 of the entire application within a storage mechanism, such as a database 110. The application state 132 will be associated with the specific user that is accessing the application.

At some later point in time, the user may need to access the application as of the previously saved state. This situation may occur, for example, when the user changes his/her access point to the application from one of the devices 102a, 102b, or 102c to a different device. This situation may also occur, for example, if the user shuts down a device at an earlier point in time, and at a later point in time needs to re-access the application (even from the same device).

In operation, when the user switches devices and/or later needs to re-access the application, the system 100 will recognize that user is seeking to access the same application. In this situation, if it can be determined that there was a previously saved application state 132 for the user, then the application state 132 will be restored for the same user/application.

This restoration of the application state 132 permits the user to move from one device to another, such that the same state from the first device is presented to the user even after moving to a second device. In addition, this permits the user to shut down a device at an earlier point in time, and later be presented with the same state for the application at a later point in time when the device is turned back on.

In system 100, user station 102a comprises any type of computing station that may be used to operate or interface with a server 118. Examples of such user stations 102 include for example, workstations, personal computers, laptop computers, or remote computing terminals. Tablet device 102b comprises any type of portable tablet device, including for example, tablet computers, portable readers, etc. Mobile telephone device 102c comprises any mobile device that can suitably access an application on application server 118, such as smartphones and programmable mobile handsets. It is noted that the invention is not limited in its application to just these types of devices. The embodiments of the invention are applicable to any computing device that works in conjunction with an application that relates to an application state. As just one example, the present invention may also be employed with TV (television) products that run remote applications, e.g., to handle and access calendar, appointments, and/or accounts.

User station 102a, tablet device 102b, and mobile telephone 102c comprises a display device, such as a display monitor or screen, for displaying scheduling data and interface elements to users. User station 102a, tablet device 102b, and/or mobile device 102c may also comprise one or more input devices for the user to provide operational control over the activities of system 100, such as a mouse, touch screen, keypad, or keyboard. The users of user station 102a, tablet device 102b, and/or mobile device 102c correspond to any individual, organization, or other entity that uses system 100 to remotely access applications on application server 118, such as a CRM application on application server 118.

The database 110 corresponds to any type of computer readable mediums or storage devices. The computer readable storage devices comprise any combination of hardware and software that allows for ready access to the data within database 110. For example, the computer readable storage device could be implemented as computer memory or disk drives operatively managed by an operating system.

Figure 2:
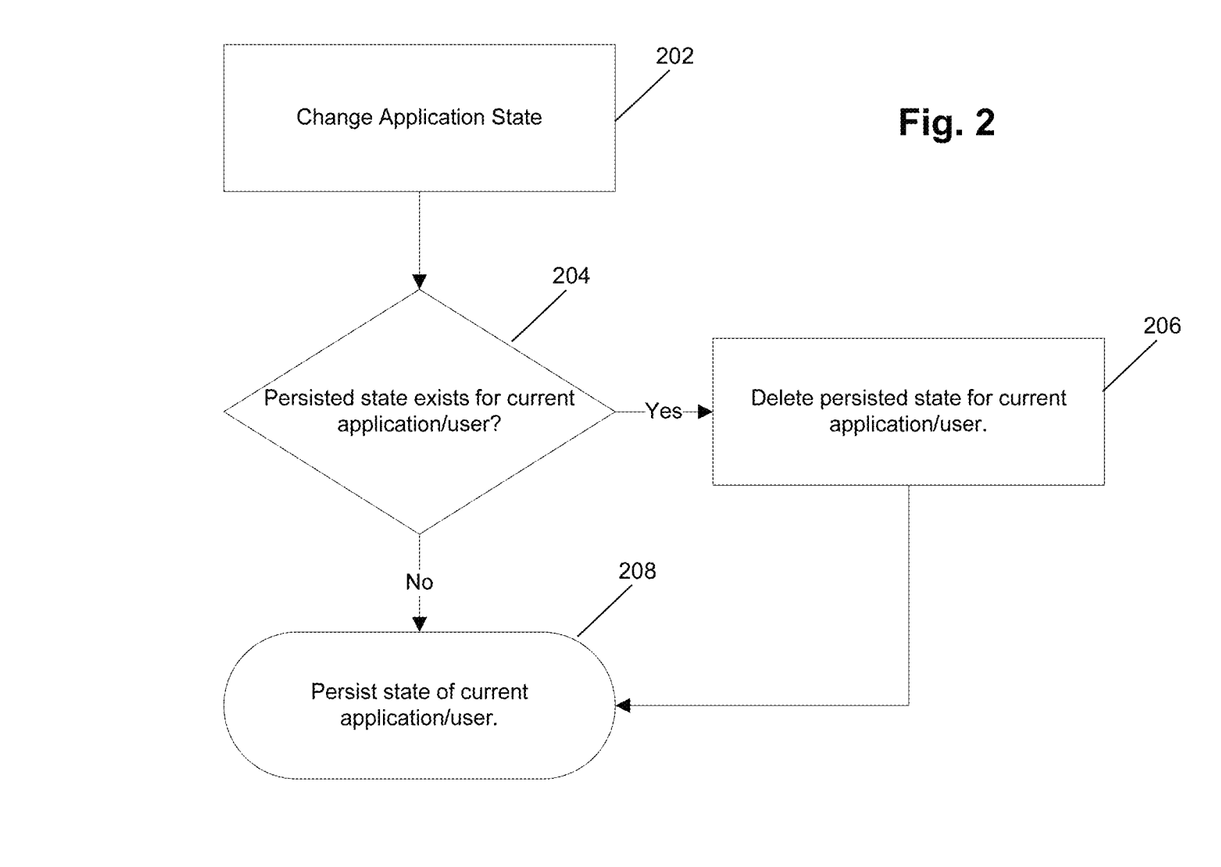
FIG. 2 illustrates a flowchart of an approach to implement continuous application state according to embodiments of the invention.

FIG. 2 illustrates a flowchart of when a user takes actions that change an application state (202). Such a change to an application state may occur, for example, when a user accesses a CRM application from a mobile device such as a mobile telephone or tablet device.

When a user accesses the CRM application the current state of the application is serialized and stored in a persistent store (e.g. a database) associated with the user. In some embodiments, the persisted state comprises transaction, view, controller, model, and/or scope state.

Each new persisted application state associated with a user replaces any previous persisted application state. Therefore, a determination is made whether a persisted state already exists for the current application and current user (204). If so, then the persisted state is deleted for the current application/user (206). Thereafter, the current state for the application/user is persisted, e.g., in a database (208).

Figure 3:
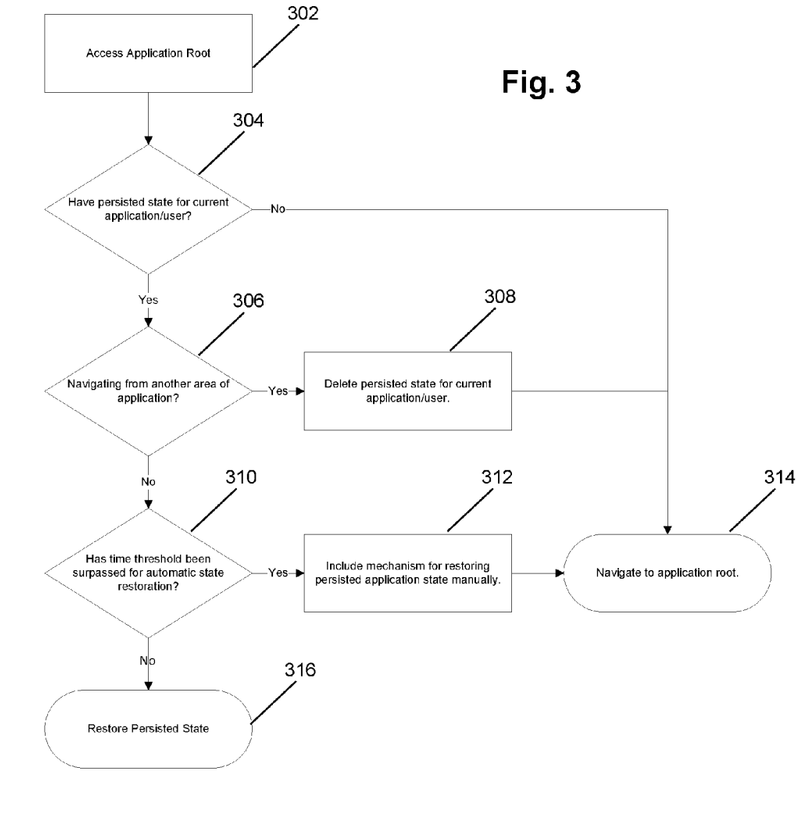
FIG. 3 illustrates a flowchart of an approach to implement continuous application state when a user attempts to navigate to an application root according to embodiments of the invention.

FIG. 3 illustrates a flowchart of when a user attempts to access the application root (302). If the user navigates to the root of the application from any other area in the application the state is deleted. This is to avoid certain types of erroneous looping behavior when the user is attempting to access the application root. On subsequent application root access, the store is evaluated to determine if a persisted state exists for the current user.

Therefore, a determination is made whether there is a persisted state for the current application/user (304). If the persisted state does not exist, then navigation is made to the application root (314).

If the persisted state does exist, then a further determination is made whether the user is navigating from another area of the application (306). If the user is navigating from another area of the application, then the persisted state is deleted for the current application/user (308). At this point, the user is permitted to navigate to the application root (314).

If the user is not navigating from another area of the application, then a check may be made to see if a threshold (e.g., time threshold) has been surpassed for state restoration (310). For example, this situation may arise if the user is re-starting a device that had previously been shut down, and the current checking is being made to ensure that stale state does not get restored. If the time threshold has not been exceeded, then the previous state is automatically restored (316).

On the other hand, even if the time threshold has been exceeded, a mechanism may be provided to allow the user to nevertheless restore the previous state (312). For example, a bookmarking mechanism may be employed to allow a user to manually restore the persisted state, e.g., by accessing a bookmark for the previously saved state. Thereafter, navigation is performed to the application root.

Therefore, depending on the amount of time that has passed since the application state was persisted the user may be presented w/ a mechanism to restore the state manually (e.g. Bookmark) instead of automatically restoring the state. After some time persisted state may become irrelevant and as such may be deleted. In cases where the client modifies the current state of the application without interacting w/ the server (e.g. client side back navigation) the client may notify the server of the state change to keep the persisted state in sync.

Figure 4A:
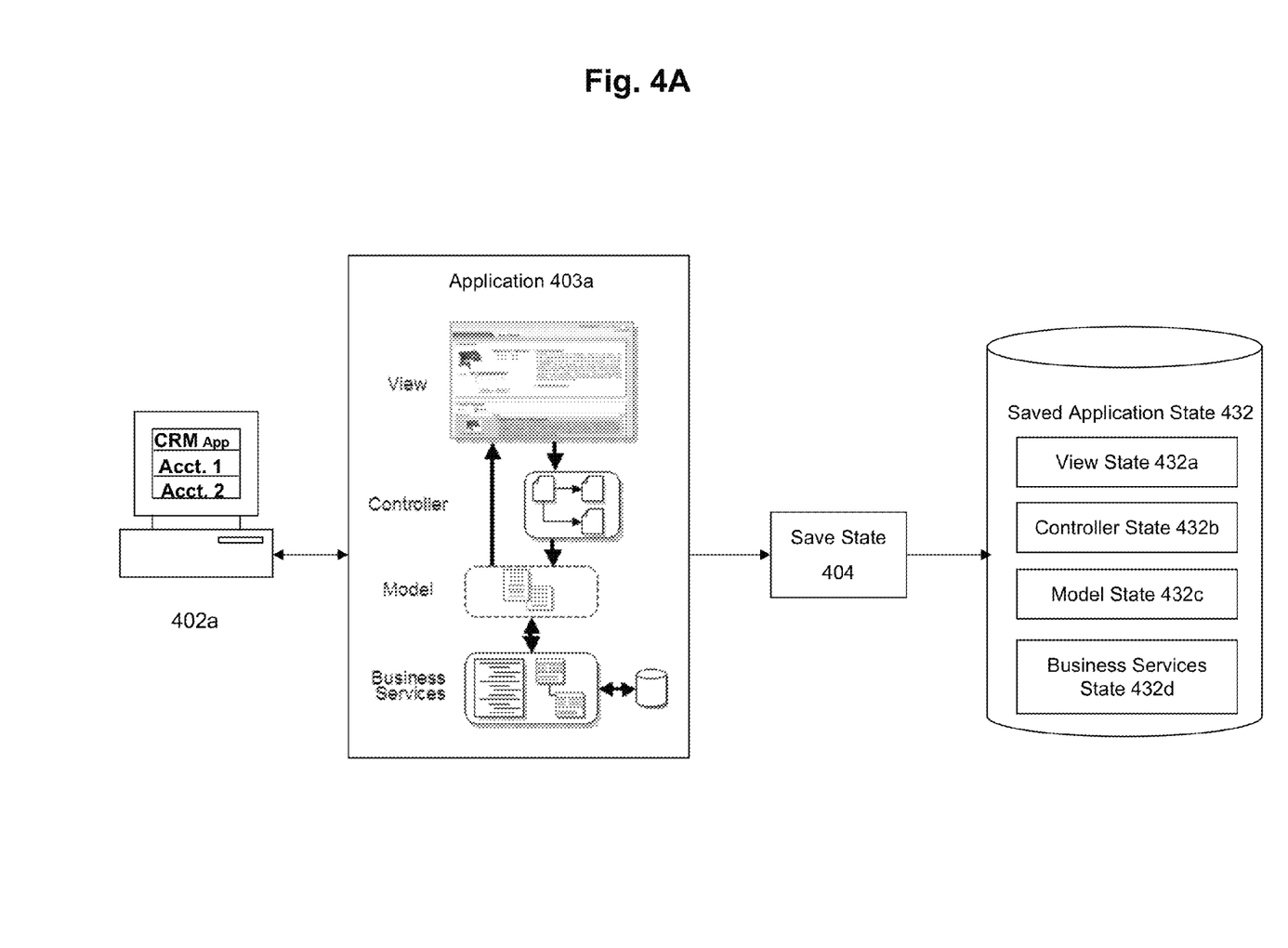
FIGS. 4A and 4B illustrate approaches to save and restore application states according to embodiments of the invention.
Figure 4B:
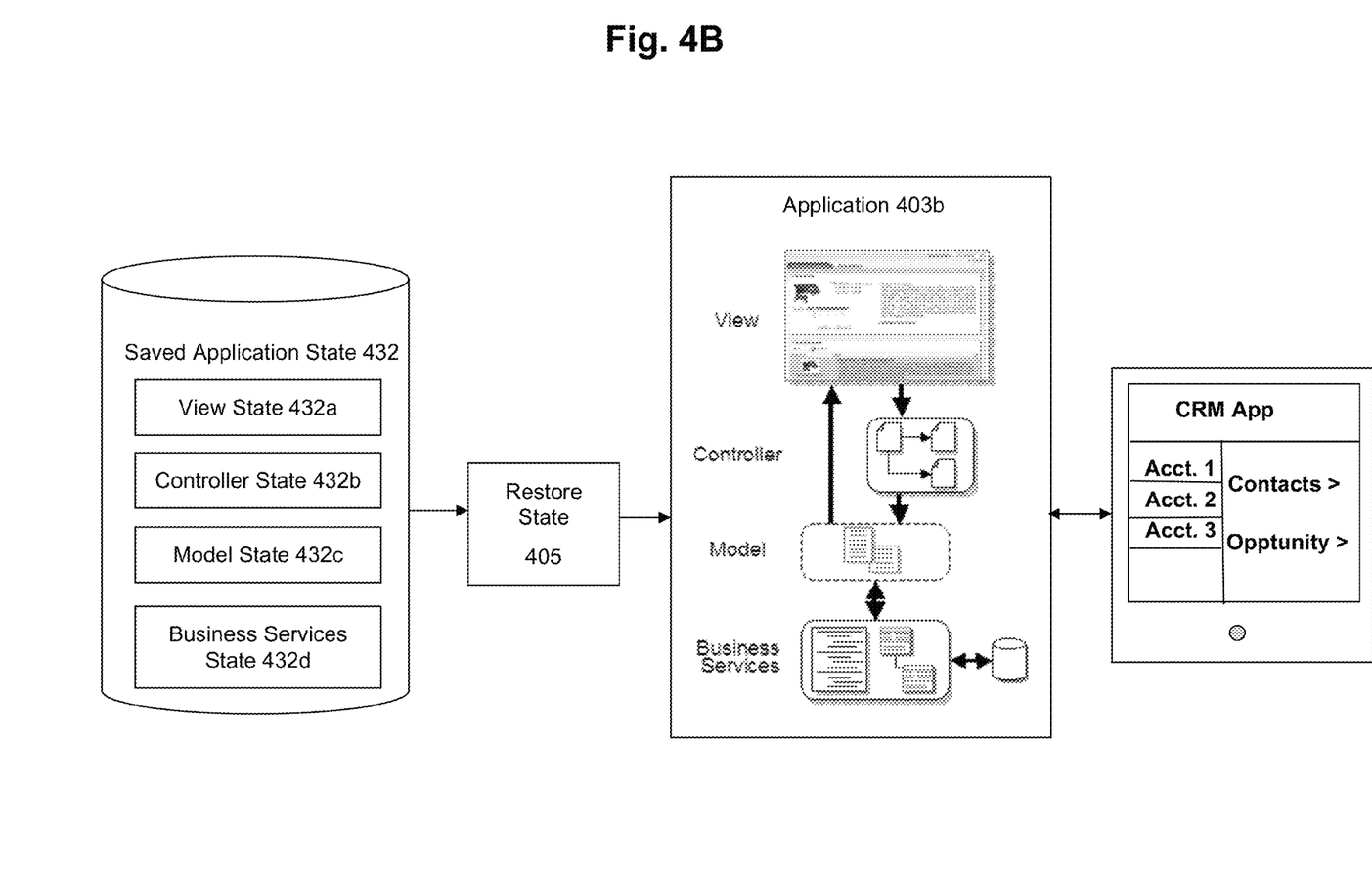

FIGS. 4A and 4B illustrate an example approach for implementing some embodiments of the invention. A user device, such as user station 402a, accesses an application 403a for which continuous application state is desired. The application 403a may be structured using any suitable architecture. FIG. 4A shows an example architecture for the application 403a, which has a model-view-controller (MVC) technology stack that includes a separation of the business logic, page navigation, and user interface, which operates to separate the representation of information from the user's interaction with that data. This architecture includes a model layer that represents the data values related to the page/information (hereinafter "page") to be or currently displayed to the user at the user station 402a. The view layer corresponds to the user interface page that is displayed to the user, and is used to view or modify the data on the page. A view can be any output representation of data. The controller layer processes the user inputs and determines page navigation, providing the interface logic between the view layer and the model layer. The model layer includes application data and business rules, and the controller layer mediates input, converting it to commands for the model or view.

One or more operations 404 can be performed to save the state 432 for application 403a. The operation(s) 404 to generate the saved state 432 for the application 403a can generally be characterized as a de-hydration operation, in which the user session is operated upon to store the different parts of the application 403a into a storage system, e.g., a persistent data store using a database system. For the application architecture shown in this figure, the saved application state 432 may include a saved view state 432a, saved controller state 432b, saved model state 432c, and saved business services state 432d.

The view state 432a is used to hold the current state of the view layer. For example, if the user is currently viewing a particular page (e.g., page 2 of 8 total pages), then the view state 432a can be configured to contain information identifying that particular page currently being viewed by the user.

The saved controller state 432b holds the current state of the controller layer. The controller layer may be used, for example, to send commands to the view layer to change the view's presentation of the model layer (e.g., by scrolling through a document). The controller layer can also be used to send commands to the model layer to update the model's state (e.g. for editing a document). If the current state of the controller layer involves either one of these sets of commands, then the controller state 432b can be configured to save that information.

The model state 432c is used to hold the current state of the model layer. The model layer includes a representation of the application data, which may change over time, e.g., based upon commands received from the user through the view and controller layers. Therefore, the model state 432c can be used to hold the current state of the representation for the application data from the model layer.

The business services state 432d holds the current state of the business services layer. Examples of such business services include Java services, web services, business intelligence services, and portlets. This layer provides the underlying data that is represented through the model layer. The physical data may be further stored in a lower data services layer, e.g., in a database or web services data storage.

Any suitable approach can be taken to store the state of the various layers of the application 403a into the view state 432a, controller state 432b, model state 432c, and business services state 432d of the saved application state 432. One possible approach is to employ the Java-based Savepoint mechanism that is provided by the Application Development Framework (ADF), available within the Oracle Fusion product from Oracle Corporation of Redwood Shores, Calif.

Once the application state 432 has been saved, the user can then use another device to access the same application 403a while maintaining continuity for the application state. This means that the user can use the application from a first device, then proceed to a second device and access the application from that second device at the same point at which the user had left the application at the first device.

FIG. 4B illustrates this process from the point of view of the second device 402b (e.g., a tablet device), after the application state 432 has already been saved from the user's operation of the application at the first device 402a (e.g., a user station). At this point, the state of the application had already been saved, e.g., by saving and storing the state of the various layers of the application into the view state 432a, controller state 432b, model state 432c, and business services state 432d.

One or more restore operations 405 are used to restore the state of the view layer, controller layer, model layer, and business services layer for the restored application 403b. A re-hydration operation is performed to retrieve the state of these various application layers from the saved state 432, and to restore the application layers as appropriate to regain the previous state of the application 403b. For example, if the user had previously been viewing page 2 of 8 total pages, then this information would have been stored in view state 432a. The restore operation 405 would restore the state of the view layer for application 403b such that the appropriate page (e.g., 2 of 8) is displayed to the user on tablet device 402b.

There are multiple approaches that can be taken to save and restore the state of an application, including saving a physical copy of the application state and a logical copy of the application state.

Figure 5A:
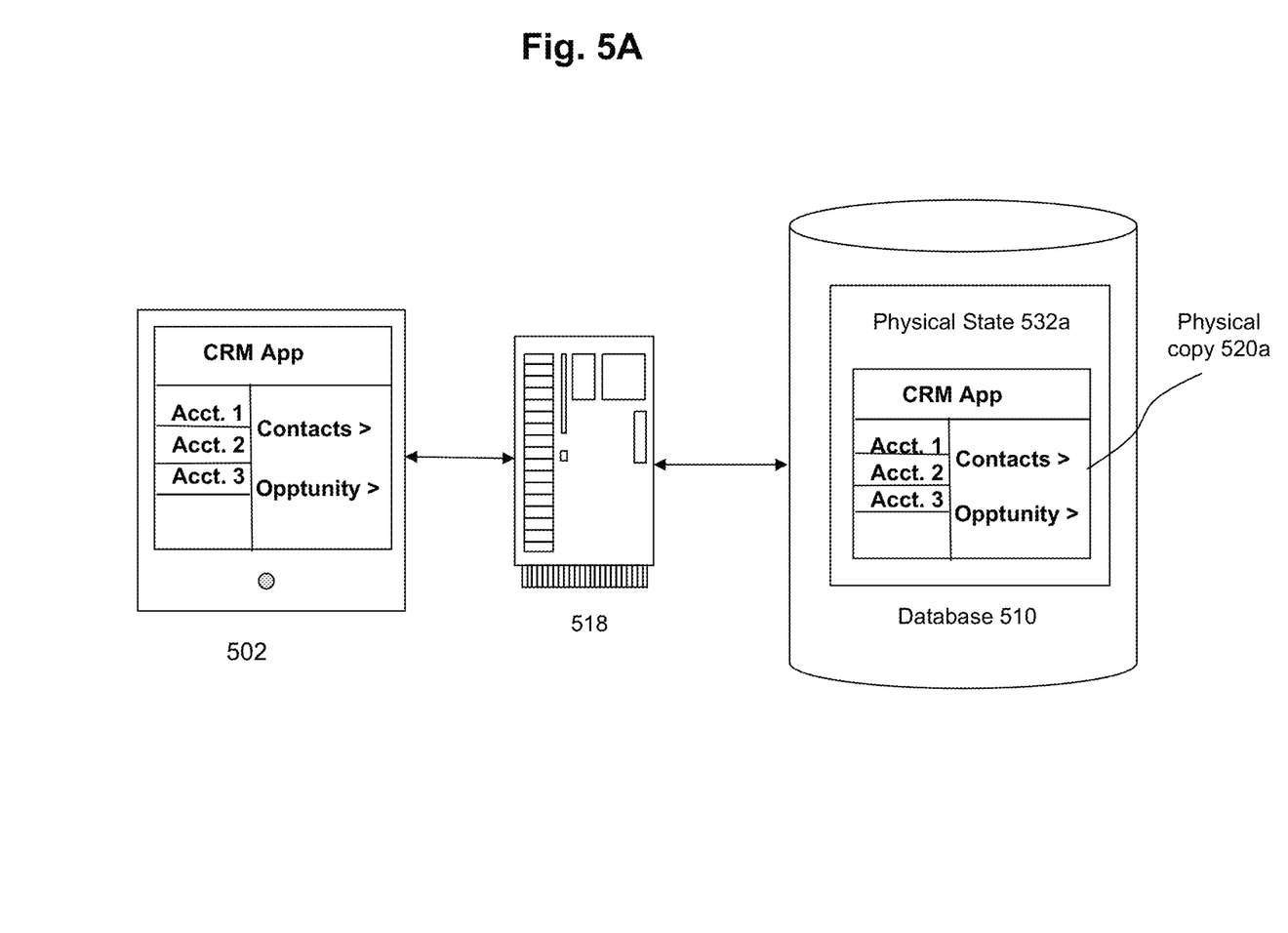
FIG. 5A illustrates an approach to utilize a physical copy of an application state according to embodiments of the invention.

FIG. 5A provides an illustration of the approach whereby a physical copy of the application state is saved for the application. This approach stores the physical state 532a of the application, such that a physical copy 520a of the application state is saved in a data store 510. For example, for a database-related application, a snapshot (e.g., a materialized snapshot) can be taken of the query results and saved as part of the physical copy 520a of the application state. In this approach, the set of data pertaining to the application is saved within the data store 510. During the restore operation, the new device merely needs to access the stored physical copy 520a to provide continuous access to the user.

Figure 5B:
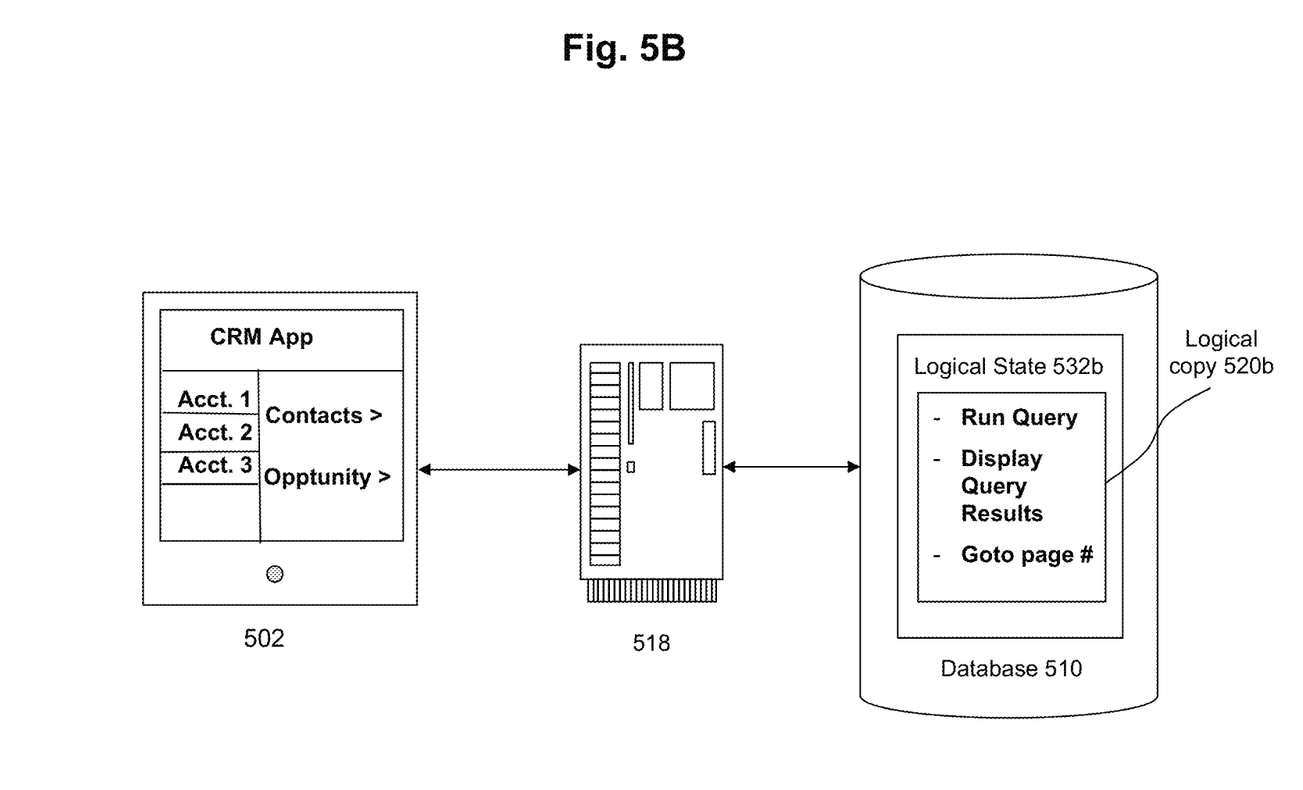
FIG. 5B illustrates an approach to utilize a logical copy of an application state according to embodiments of the invention.

FIG. 5B provides an illustration of the approach in which a logical copy of the application state is saved for the application. This approach stores the logical state 532b of the application, such that a logical copy 520b of the application state is saved in a data store 510. Instead of maintaining a copy of the actual application data itself, the logical state 532b tracks the set of operations and parameters to recreate the application data.

For example, assume that the application is a database-related application that executes a SQL query for viewing by a user. The approach to save a logical state 532b would include a logical copy 520b that includes appropriate instructions to perform the SQL query with identification of the data set accessed by the SQL query. During the restore operation, restoration of the logical copy 520b would result in execution of the SQL query against the appropriate data set to retrieve/recreate the database results for viewing by the user. In contrast, the approach to implement a physical copy 502a would have a physical state 532a that already includes a copy of the previously-saved query results and would therefore not need to re-execute the SQL query at the restoration time.

In some embodiments, a series or sequence of application states may be stored over a period of time for an application. One reason for saving the series/sequence of application states is to provide the ability for a user to navigate through a series of different application states on a continuous basis, even if the user moves from one device to another.

Figure 6:
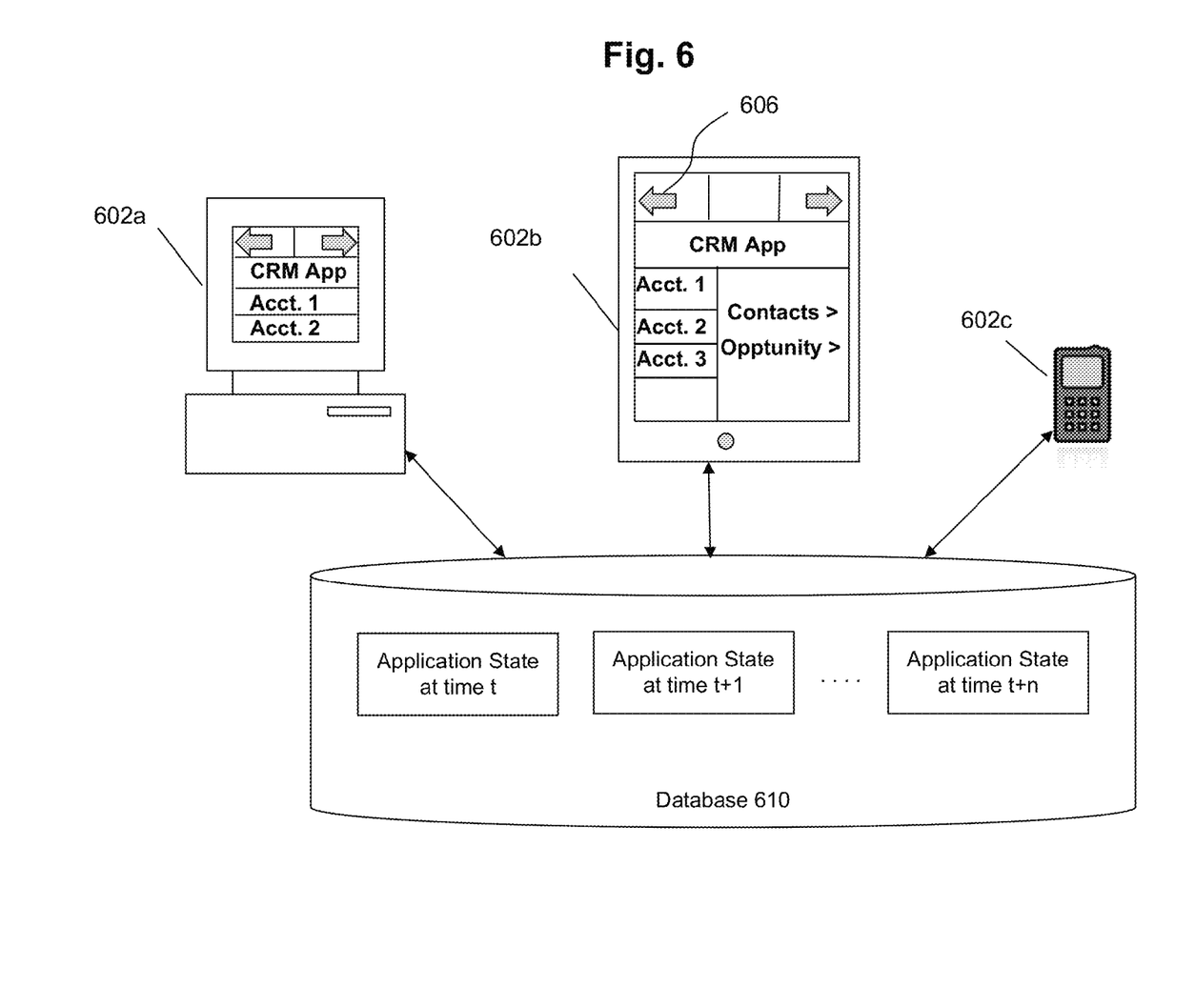
FIG. 6 illustrates a series/sequence of saved application states according to embodiments of the invention.

FIG. 6 provides an illustration of this situation. A series of different application states have been stored in data store 610. The application states are saved for a sequence of different time points (e.g., for time t, time t+1, . . . time t+n). The sequence may be stored on the basis of other properties as well, instead of time. For example, the different saved states may be created or triggered on the basis of threshold amount/level of changes detected for the application state. The different saved states may also pertain to the different views accessed by the user, e.g., to preserve the differences in state when a user navigates from one page view to another page view.

The user may need to move from one device to another. For example, the user may need to switch between a user station 602a, tablet 602b, and/or mobile telephony/handheld device 602c. When viewing the application data on the devices, the user may seek to navigate forward and/or backwards through a series of views on the devices. One or more interface elements, such as navigation arrows 606, may be used by the user to navigate forwards or backwards through the data views.

The series/sequence of saved application states within data store 610 are used to provide continuous state functionality in this situation. When the user has moved to another device, navigating forwards or backwards results in access to the saved sequence of application states in a forwards or backwards direction, respectively. The restoration of the application states may be performed only at the time it is needed, e.g., at the moment that a user navigates a page view requiring restoration of the application state. Alternatively, the application state can be pre-emptively restored based at least in part upon pre-fetching analysis that suggests an imminent or future need for the restoration of the application state, such as when a user is navigating in a particular direction in the sequence of application states and pre-emptive restoration is performed since it can be determined that the user will likely need access to additional application states in that direction.

While the above description has discussed the usage of continuous application state in the context of a "user" that moves from one "device" to another, it is noted that the inventive concepts are not limited in their application only to these types of entities. The application states may be associated with any entity or groups of entities—not just specific users. For example, the usage of continuous application states may be advantageously applied to groups of users having common needed to access data, e.g., at the team or departmental level. An example scenario that is applicable consists of a sales situation where multiple sales personnel are assigned to assist a customer, and continuous application state is used to ensure seamless access to the appropriate CRM application data for that customer between the multiple sales personnel on multiple devices, e.g., during a hand-off from one sales person to another the application state left by the first salesperson is accessible by the second salesperson even if they are using different devices.

Therefore, what has been described is an improved approach for maintaining continuous state. The inventive approach of some embodiments permits the user to move from one device to another, such that the same state from the first device is presented to the user even after moving to a second device. In addition, the user is permitted to shut down a device at an earlier point in time, and later be presented with the same state for the application at a later point in time when the device is turned back on.

System Architecture Overview

Figure 7:
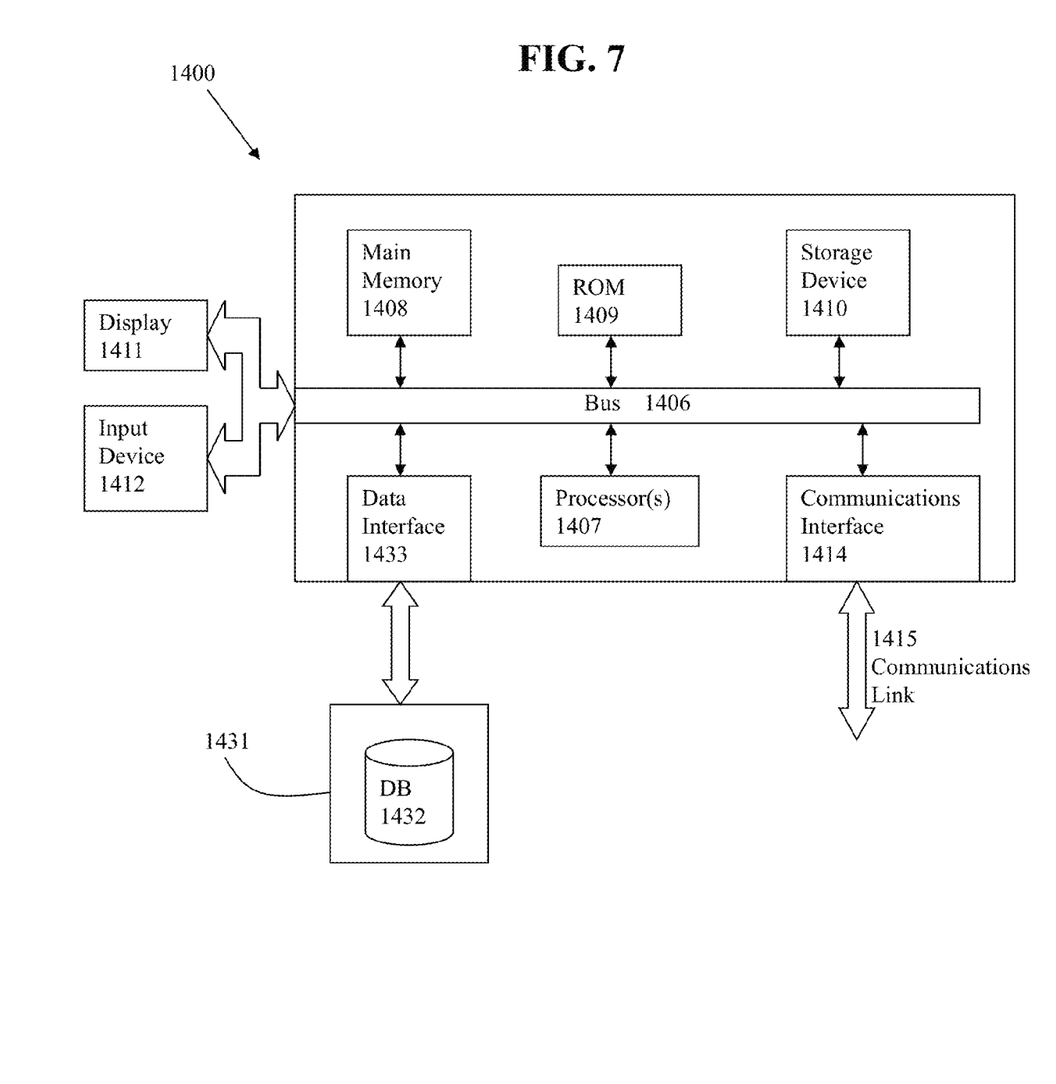
FIG. 7 depicts a computerized system on which an embodiment of the invention can be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for using continuous application state, comprising:
   accessing an application at a first device by an entity, the application being associated with an application state;
   saving the application state to generate a saved application state, the saved application state comprising a series or sequence of application states;
   changing access for the application by the entity to a second device;
   determining whether to restore the saved application state or delete the saved application state when an application root is accessed at the second device by determining whether the entity is navigating to the application root from a non-root area of the application at the second device;
   deleting the saved application state and navigating to the application root at the second device when the entity navigates to the application root from the non-root area;
   determining whether to restore the saved application state or whether to navigate to an application root when the entity does not navigate to the application root from the non-root area, a time threshold being checked to determine whether to restore the saved application state or whether to navigate to an application root;
   navigating to the application root when the application root should be accessed at the second device; and
   restoring the saved application state when the application state should be restored, so that the entity is provided access to the application state at the second device.

2. The method of claim 1, the application comprising a CRM application, and the application state comprising to a state for the CRM application.

3. The method of claim 1, a determination is being made whether a previously saved application state exists, such that the previously saved application state is deleted before saving the application state to generate the saved application state.

4. The method of claim 1, the application comprising a CRM application structured using an architecture including a view layer, controller layer, model layer and business services layer, and the application state corresponds to state for the CRM application including a view state, controller state, model state and business services state, an application server saving the application state associated with the entity in a storage mechanism, the entity comprising an individual user or a group of users;
   the saved application state comprising a physical copy of the application state including application data pertaining to the application or the saved application state comprising a logical copy of the application state including a logical state that tracks operations or parameters to recreate the application data, the saved application state comprising a series or sequence of application states so that, upon restoration, backward or forward navigation at the second device results in access to the saved series or sequence of application states in a respective forward or backward direction, a series of sequence of application states being saved on a basis of a sequence of different time points, a threshold amount of changes for the application state, or different views accessed by the entity;
   a first device or a second device comprising a computing station, a tablet device, a mobile telephone device or a television product, in which the second device and the first device are the same device;
   determining whether to restore the saved application state or whether to navigate to an application root comprising 1) checking whether a previously saved application state exists, 2) checking whether the entity is navigating from the non-root area of the application, and/or 3) checking whether a time threshold is exceeded;
   navigating to the application root comprising navigating to the application root when 1) no previously saved application state exists, 2) the entity is navigating from the non-root area of the application, or 3) the time threshold is exceeded; and
   restoring the saved application state comprising automatically restoring the saved application state if 1) a previously saved application state exists, 2) the entity is not navigating from the non-root area of the application and 3) the time threshold is not exceeded, restoring the saved application state comprising manually restoring the saved application state by using a bookmark interface mechanism when the time threshold is exceeded, and restoring the saved application state comprising pre-emptively restoring the saved application state based at least in part upon pre-fetching analysis that suggests an imminent or future need for restoration.

5. The method of claim 1, in which a mechanism is provided to manually restore the saved application state if the time threshold is exceeded.

6. The method of claim 5, the mechanism comprising a bookmark interface mechanism.

7. The method of claim 1, in which a request to access the application root is received, such that navigation to the application root is permitted if there is no previously saved application state for the application.

8. The method of claim 1, in which the application corresponds to a view layer, controller layer, model layer, and business services layer, and the saved application state comprises a view state, controller state, model state, and business services state.

9. The method of claim 1, in which the saved application state comprises a logical copy of the application state.

10. The method of claim 1, in which the saved application state comprises a physical copy of the application state.

11. The method of claim 1, in which the entity corresponds to at least one of an individual user, a team of users, or a group of users.

12. A computer program product embodied on a non-transitory computer readable storage medium, the non-transitory computer readable storage medium having stored thereon a sequence of instructions which, when executed by a processor, causes the processor to execute a method, the method comprising:
   accessing an application at a first device by an entity, the application being associated with an application state;
   saving the application state to generate a saved application state, the saved application state comprising a series or sequence of application states;
   changing access for the application by the entity to a second device;
   determining whether to restore the saved application state or delete the saved application state when an application root is accessed at the second device by determining whether the entity is navigating to the application root from a non-root area of the application at the second device;

deleting the saved application state and navigating to the application root at the second device when the entity navigates to the application root from the non-root area;

determining whether to restore the saved application state or whether to navigate to an application root when the entity does not navigate to the application root from the non-root area, a time threshold being checked to determine whether to restore the saved application state or whether to navigate to an application root;

navigating to the application root when the application root should be accessed at the second device; and restoring the saved application state when the application state should be restored, so that the entity is provided access to the application state at the second device.

13. The computer program product of claim 12, the application comprising a CRM application, and the application state corresponding to a state for the CRM application.

14. The computer program product of claim 12, a determination is being made whether a previously saved application state exists, such that the previously saved application state is deleted before saving the application state to generate the saved application state.

15. The computer program product of claim 12, the application comprising a CRM application structured using an architecture including a view layer, controller layer, model layer and business services layer, and the application state corresponds to state for the CRM application including a view state, controller state, model state and business services state, an application server saving the application state associated with the entity in a storage mechanism, the entity comprising an individual user or a group of users;

the saved application state comprising a physical copy of the application state including application data pertaining to the application or the saved application states comprising a logical copy of the application state including a logical state that tracks operations or parameters to recreate the application data, a saved application state comprising a series or sequence of application states so that, upon restoration, backward or forward navigation at the second device results in access to the saved series or sequence of application states in a respective forward or backward direction, a series of sequence of application state being saved on a basis of a sequence of different time point, a threshold amount of changes for the application state, or different views accessed by the entity;

the first device or the second device comprising a computing station, a tablet device, a mobile telephone device or a television product, in which the second device and the first device are the same device;

determining whether to restore the saved application state or whether to navigate to an application root comprising 1) checking whether a previously saved application state exists, 2) checking whether the entity is navigating from the non-root area of the application, and/or 3) checking whether a time threshold is exceeded;

navigating to the application root comprising navigating to the application root if it is determined that 1) no previously saved application state exists, 2) the entity is navigating from the non-root area of the application, or 3) the time threshold is exceeded; and restoring the saved application state comprising automatically restoring the saved application state if 1) a previously saved application state exists, 2) the entity is not navigating from the non-root area of the application and 3) the time threshold is not exceeded, restoring the saved application state comprising manually restoring the saved application state by using a bookmark interface mechanism when the time threshold is exceeded, and restoring the saved application state comprising pre-emptively restoring the saved application state based at least in part upon pre-fetching analysis that suggests an imminent or future need for restoration.

16. The computer program product of claim 12, in which a mechanism is provided to manually restore the saved application state if the time threshold is exceeded.

17. The computer program product of claim 16, the mechanism comprising a bookmark interface mechanism.

18. The computer program product of claim 12, in which a request to access the application root is received, such that navigation to the application root is permitted if there is no previously saved application state for the application.

19. The computer program product of claim 12, in which the application corresponds to a view layer, controller layer, model layer, and business services layer, and the saved application state comprises a view state, controller state, model state, and business services state.

20. The computer program product of claim 12, in which the saved application state comprises a logical copy of the application state.

21. The computer program product of claim 12, in which the saved application state comprises a physical copy of the application state.

22. The computer program product of claim 12, in which the entity corresponds to at least one of an individual user, a team of users, or a group of users.

23. A system for implementing continuous application state, comprising:

a first device usable by an entity to access an application, the application being associated with an application state;

a second device usable by the entity to access the application with the application state;

a memory corresponding to a computer readable storage medium; and a processor that is programmed to save the application state to generate a saved application state and to determine whether to restore the saved application state or whether to navigate to an application root by at least checking whether the entity is navigating to the application root from the non-root area of the application and a time threshold, the saved application state comprising a series or sequence of application states, in which changing access for the application by the entity from the first device to the second device causes navigation to the application root when the application root should be accessed at the second device and causes restoration of the saved application state when the application state should be restored, such that that the entity is provided access to the application state at the second device.

24. The system of claim 23, the application comprising a CRM application, and the application state corresponding to a state for the CRM application.

25. The system of claim 23, a determination is being made whether a previously saved application state exists, such that the previously saved application state is deleted before saving the application state to generate the saved application state.

26. The system of claim 23, the application comprising a CRM application structured using an architecture including a view layer, controller layer, model layer and business services layer, and the application state corresponds to state for the CRM application including a view state, controller state, model state and business services state, an application server saving the application state associated with the entity in a storage mechanism, the entity comprising an individual user or a group of users;

the saved application state comprising a physical copy of the application state including application data pertaining to the application or the saved application states comprising a logical copy of the application state including a logical state that tracks operations or parameters to recreate the application data, the saved application state comprising a series or sequence of application states so that, upon restoration, backward or forward navigation at the second device results in access to the saved series or sequence of application states in a respective forward or backward direction, a series of sequence of application states is being saved on a basis of a sequence of different time points, a threshold amount of changes for the application state, or different views access by the entity;
   the first device or the second device comprising a computing station, a tablet device, a mobile telephone device or a television product, in which the second device and the first device are the same device;
   determining whether to restore the saved application state or whether to navigate to an application root comprising 1) checking whether a previously saved application state exists, 2) checking whether the entity is navigating from the non-root area of the application, and/or 3) checking whether a time threshold is exceeded;
   navigating to the application root comprising navigating to the application root when 1) no previously saved application state exists, 2) the entity is navigating from the non-root area of the application, or 3) the time threshold is exceeded; and
   restoring the saved application state comprising automatically restoring the saved application state if 1) a previously saved application state exists, 2) the entity is not navigating from the non-root area of the application and 3) the time threshold is not exceeded, restoring the saved application state comprising manually restoring the saved application state by using a bookmark interface mechanism when the time threshold is exceeded, and restoring the saved application state comprising pre-emptively restoring the saved application state based at least in part upon pre-fetching analysis that suggests an imminent or future need for restoration.

27. The system of claim 23, further comprising a mechanism to manually restore the saved application state if the time threshold is exceeded.

28. The system of claim 27, the mechanism comprising a bookmark interface mechanism.

29. The system of claim 23, in which a request to access the application root is received, such that navigation to the application root is permitted if there is no previously saved application state for the application.

30. The system of claim 23, in which the application corresponds to a view layer, controller layer, model layer, and business services layer, and the saved application state comprises a view state, controller state, model state, and business services state.

31. The system of claim 23, in which the saved application state comprises a logical copy of the application state.

32. The system of claim 23, in which the saved application state comprises a physical copy of the application state.

33. The system of claim 23, in which the entity corresponds to at least one of an individual user, a team of users, or a group of users.

* * * * *

UNITED STATES PATENT AND TRADEMARK OFFICE
CERTIFICATE OF CORRECTION

PATENT NO. : 9,634,882 B2
APPLICATION NO. : 13/626211
DATED : April 25, 2017
INVENTOR(S) : Carter et al.

It is certified that error appears in the above-identified patent and that said Letters Patent is hereby corrected as shown below:

In the Drawings

On sheet 1 of 9, in Fig. 1, under Reference Numeral 102b, Line 5, delete "Opptunity" and insert -- Opportunity --, therefor.

On sheet 5 of 9, in Fig. 4B, Line 7, delete "Opptunity" and insert -- Opportunity --, therefor.

On sheet 6 of 9, in Fig. 5A, under Reference Numeral 502, Line 5, delete "Opptunity" and insert -- Opportunity --, therefor.

On sheet 6 of 9, in Fig. 5A, under Reference Numeral 510, Line 7, delete "Opptunity" and insert -- Opportunity --, therefor.

On sheet 7 of 9, in Fig. 5B, under Reference Numeral 502, Line 5, delete "Opptunity" and insert -- Opportunity --, therefor.

On sheet 8 of 9, in Fig. 6, under Reference Numeral 602b, Line 5, delete "Opptunity" and insert -- Opportunity --, therefor.

In the Specification

Column 8, Line 54, delete "PTSN," and insert -- PSTN, --, therefor.

In the Claims

Column 12, Line 57, Claim 23, delete "that that" and insert -- that --, therefor.

Signed and Sealed this
Twelfth Day of September, 2017

Joseph Matal
*Performing the Functions and Duties of the
Under Secretary of Commerce for Intellectual Property and
Director of the United States Patent and Trademark Office*